United States Patent

Stuber

[19]

[11] Patent Number: 6,041,367
[45] Date of Patent: Mar. 21, 2000

[54] FORECASTING RESOURCE REQUIREMENTS FOR A GROUP OF REMOVABLE MEDIA DEVICES BY MEASURING RESIDENCY TIME AND GENERATING MODEL

[75] Inventor: Richard L. Stuber, Colorado Springs, Colo.

[73] Assignee: MCI Communications Corporation, Washington, D.C.

[21] Appl. No.: 08/992,384

[22] Filed: Dec. 17, 1997

[51] Int. Cl.[7] .............................. G06F 13/10; G05B 13/04
[52] U.S. Cl. ........................ 710/18; 395/500.42; 711/112
[58] Field of Search .......................... 395/500.42; 710/18; 711/112

[56] References Cited

U.S. PATENT DOCUMENTS

| | | | |
|---|---|---|---|
| 4,876,662 | 10/1989 | Pence | 365/78 |
| 5,590,376 | 12/1996 | Kou | 710/19 |
| 5,606,688 | 2/1997 | McNutt et al. | 711/170 |
| 5,898,863 | 4/1999 | Ofer et al. | 395/500.44 |

Primary Examiner—Thomas C. Lee
Assistant Examiner—Albert Wang

[57] ABSTRACT

The present invention measures the usage level of removable media devices using residency time. In one embodiment, a usage level measurement software facility receives a number of data storage medium access requests. For reach received request, the facility performs a number of steps. The facility first assigns the request to a particular one of the removable media devices. Then, under the control of the assigned removable media device, the data storage medium access request is performed. For each performed request, the facility records a residency time. The residency time reflects the amount of time taken by the assigned removable media device to perform the request. The facility aggregates the recorded residency times to produce a measure of the collective usage level of the plurality of removable media devices.

35 Claims, 5 Drawing Sheets

| DATE | MNTS | TOTAL HSCQUE | TOTAL OTHQUE | TOTAL OTHROB | TOTAL PTPQUE | TOTAL PTP USE | TOTAL DESTQUE | TOTAL DESTROB | TOTAL DRIVEWAIT | TOTAL RESPTIME | MVS ALLOC | TOTAL RESDTIME |
|---|---|---|---|---|---|---|---|---|---|---|---|---|
| 01DEC96 | 3193 | 5:47:32 | 0:02:17 | 0:18:10 | 0:00:03 | 0:12:48 | 0:38:56 | 4:18:30 | 6:20:47 | 17:39:03 | 667:46 | 703:05 |
| 02DEC96 | 2046 | 5:01:14 | 0:04:25 | 0:23:59 | 0:00:18 | 0:15:45 | 0:21:19 | 2:50:47 | 4:03:35 | 13:01:21 | 398:06 | 424:10 |
| 03DEC96 | 1689 | 4:36:46 | 0:01:36 | 0:15:41 | 0:00:07 | 0:11:59 | 0:20:46 | 2:20:49 | 3:21:46 | 11:09:30 | 447:31 | 469:51 |
| 04DEC96 | 1900 | 4:45:07 | 0:02:11 | 0:15:46 | 0:00:02 | 0:12:01 | 0:19:57 | 2:36:52 | 3:47:20 | 11:59:20 | 359:20 | 383:20 |
| 05DEC96 | 1525 | 3:31:59 | 0:01:01 | 0:08:47 | 0:00:06 | 0:06:36 | 0:11:46 | 2:03:48 | 3:00:00 | 9:03:59 | 394:10 | 412:19 |
| 06DEC96 | 1491 | 3:09:58 | 0:00:51 | 0:10:24 | 0:00:02 | 0:07:44 | 0:14:53 | 2:03:11 | 2:56:54 | 8:43:56 | 321:39 | 339:08 |
| 07DEC96 | 1280 | 4:42:03 | 0:00:26 | 0:06:38 | 0:00:00 | 0:04:53 | 0:16:49 | 1:43:46 | 2:32:27 | 9:27:02 | 356:46 | 375:41 |
| 08DEC96 | 2587 | 9:36:14 | 0:03:23 | 0:27:16 | 0:00:12 | 0:19:23 | 0:39:33 | 3:34:02 | 5:11:14 | 19:51:18 | 515:47 | 555:31 |
| 09DEC96 | 1863 | 4:00:28 | 0:02:57 | 0:18:29 | 0:00:17 | 0:12:26 | 0:27:13 | 2:36:53 | 3:43:06 | 11:21:49 | 487:49 | 510:33 |
| 10DEC96 | 1748 | 3:32:01 | 0:01:00 | 0:12:31 | 0:00:02 | 0:08:20 | 0:17:08 | 2:25:52 | 3:28:07 | 10:05:02 | 443:41 | 463:52 |
| 11DEC96 | 1495 | 2:57:37 | 0:00:56 | 0:07:31 | 0:00:00 | 0:05:19 | 0:14:41 | 2:06:15 | 2:57:42 | 8:30:03 | 247:47 | 264:48 |
| 12DEC96 | 1475 | 3:07:59 | 0:01:07 | 0:07:06 | 0:00:00 | 0:04:54 | 0:14:10 | 2:03:58 | 2:54:55 | 8:34:10 | 299:48 | 316:57 |
| 13DEC96 | 1466 | 2:54:54 | 0:00:28 | 0:07:52 | 0:00:03 | 0:05:15 | 0:19:11 | 2:04:43 | 2:54:12 | 8:26:40 | 288:35 | 305:29 |
| 14DEC96 | 1118 | 2:12:58 | 0:00:31 | 0:07:14 | 0:00:03 | 0:05:18 | 0:13:19 | 1:33:29 | 2:13:18 | 6:26:10 | 300:50 | 313:43 |
| 15DEC96 | 2209 | 4:11:12 | 0:03:22 | 0:21:35 | 0:00:12 | 0:15:14 | 0:38:16 | 3:07:06 | 4:25:47 | 13:02:43 | 591:07 | 617:13 |
| 16DEC96 | 1604 | 3:30:20 | 0:02:49 | 0:21:03 | 0:00:06 | 0:14:13 | 0:19:51 | 2:17:08 | 3:12:39 | 9:58:10 | 418:17 | 438:14 |
| 17DEC96 | 1348 | 2:57:10 | 0:01:06 | 0:11:42 | 0:00:06 | 0:07:42 | 0:10:09 | 1:54:46 | 2:39:33 | 8:02:15 | 313:34 | 329:39 |
| 18DEC96 | 1385 | 2:50:50 | 0:01:35 | 0:08:44 | 0:00:11 | 0:05:59 | 0:13:19 | 1:56:21 | 2:46:08 | 8:03:07 | 232:03 | 248:10 |
| 19DEC96 | 1439 | 2:55:52 | 0:00:42 | 0:13:38 | 0:00:02 | 0:09:11 | 0:10:38 | 2:01:05 | 2:52:43 | 8:24:52 | 234:27 | 251:18 |
| 20DEC96 | 2691 | 5:08:57 | 0:01:52 | 0:17:29 | 0:00:06 | 0:12:15 | 0:36:54 | 3:46:10 | 5:23:18 | 15:27:03 | 410:31 | 441:26 |
| 21DEC96 | 2130 | 4:01:17 | 0:01:19 | 0:13:11 | 0:00:12 | 0:09:22 | 0:26:53 | 2:59:18 | 4:17:24 | 12:08:56 | 461:53 | 486:12 |
| 22DEC96 | 4132 | 10:04:31 | 0:06:14 | 0:51:19 | 0:00:26 | 0:35:19 | 1:09:00 | 5:55:02 | 8:19:22 | 27:01:13 | 975:03 | 1029:06 |
| 23DEC96 | 3676 | 7:15:35 | 0:06:38 | 0:39:41 | 0:00:19 | 0:28:03 | 0:55:08 | 5:07:12 | 7:24:12 | 21:56:48 | 709:48 | 753:42 |
| 24DEC96 | 2627 | 5:09:20 | 0:02:13 | 0:23:41 | 0:00:12 | 0:16:17 | 0:28:03 | 3:41:55 | 5:13:44 | 15:10:29 | 660:07 | 690:29 |
| 25DEC96 | 1924 | 3:52:33 | 0:02:29 | 0:13:58 | 0:00:05 | 0:10:23 | 0:23:06 | 2:41:19 | 3:52:12 | 11:15:07 | 369:10 | 391:41 |
| 26DEC96 | 3256 | 5:43:52 | 0:02:57 | 0:28:49 | 0:00:13 | 0:19:19 | 0:34:33 | 4:34:37 | 6:31:25 | 18:15:46 | 595:52 | 632:24 |
| 27DEC96 | 2740 | 5:24:19 | 0:01:46 | 0:27:00 | 0:00:12 | 0:19:09 | 0:26:00 | 3:52:13 | 5:27:47 | 15:58:26 | 444:01 | 475:59 |
| 28DEC96 | 2155 | 3:23:32 | 0:00:58 | 0:11:58 | 0:00:06 | 0:08:30 | 0:28:16 | 3:00:45 | 4:24:02 | 11:38:08 | 434:15 | 457:32 |
| 29DEC96 | 4631 | 9:18:06 | 0:14:25 | 1:31:58 | 0:00:48 | 1:00:10 | 1:23:18 | 6:42:03 | 9:32:48 | 29:43:37 | 1024:15 | 1083:43 |
| 30DEC96 | 3699 | 7:51:14 | 0:05:55 | 0:52:16 | 0:00:30 | 0:36:24 | 0:42:24 | 5:12:32 | 7:27:20 | 22:51:34 | 717:31 | 763:15 |
| 31DEC96 | 3198 | 6:13:51 | 0:03:36 | 0:38:17 | 0:00:35 | 0:26:04 | 0:31:12 | 4:33:07 | 6:22:31 | 18:49:13 | 494:12 | 531:51 |

FORECASTING RESOURCE REQUIREMENTS FOR A GROUP OF REMOVABLE MEDIA DEVICES BY MEASURING RESIDENCY TIME AND GENERATING MODEL

TECHNICAL FIELD

The invention relates generally to the field of peripheral devices, and, more specifically, to the field of monitoring peripheral device usage levels.

BACKGROUND OF THE INVENTION

Many computer systems process and/or produce large volumes of data. In order to maintain such data persistently, computer systems typically store the data on data storage media, such as magnetic disks or tapes. It is common for a computer system to use a device known as a drive to access data on a unit of data storage media, by causing the drive to either read data from or write data to the data storage media. Drives usually contain an accessing component, also called a "head," for reading data from or writing data to a unit of data storage media; a positioning component for positioning the unit of data storage media relative to the head; and control logic for controlling the head and positioning component in order to read from or write to the unit of data storage media.

Unlike magnetic disks that are sealed inside their drives, tape cartridges and units of other storage media are separable from their drives. This allows multiple tape cartridges to be accessed by the same tape drive. Indeed, some computer systems use large tape subsystems that combine a number of tape drives with a large number of tape cartridges. Many such tape subsystems use robotic mounting systems that transfer tape cartridges between tape drives and storage locations.

The fact that multiple tape cartridges may be accessed by the same tape drive adds a degree of flexibility to decisions to acquire additional tape capacity. That is, two different kinds of tape capacity may be maintained independently. By acquiring additional tape cartridges, one can increase the total storage volume of tape cartridges without increasing the total number of tape drives. Similarly, by acquiring additional tape drives, one can increase the number of tape cartridges that may be accessed simultaneously without increasing the total number of tape cartridges.

For magnetic disks that are sealed into their drives, the decision to acquire additional drives is very often based on a need to increase total storage capacity. The decision to acquire additional tape drives, however, is independent of total storage capacity needs. Instead, the decision to acquire additional tape drives is best based on the number of tape cartridges that need to be simultaneously accessed by the computer system.

In some cases, automated systems for analyzing demand in a tape subsystem utilize a "peak mounts" time-indexed statistic indicating the largest number of tape drives simultaneously accessing tape cartridges during each hour. This approach is sometimes described as the "concurrent allocation" approach to demand analysis. This peak mounts statistic is very reflective of instantaneous demand, but is a poor indicator of overall, time-distributed demand. The peak mounts statistic is therefore a disadvantageous measure of demand in computer systems that execute jobs having some tolerance for delays in performing tape cartridge access requests, where overall demand is more important than instantaneous demand. An automated method for providing a more useful measure of drive utilization would therefore have significant utility.

SUMMARY OF THE INVENTION

The usage level measurement software facility of the present invention overcomes the limitations associated with the automated systems for analyzing data storage medium access device demand described above. In accordance with the invention, a usage level measurement software facility ("the facility") maintains a usage measure called "residency time" for an array of tape drives or other removable media devices. The tape drives of the array are used by a computer system to perform tape cartridge access requests ("access requests") for reading from or writing to tape cartridges. Residency time reflects, for a period of time such as a day, the total amount of time all of the tape drives spend performing access requests. By comparing actual residency time for the array to theoretical maximum residency time, the facility determines a relative level of utilization of the array.

Because theoretical maximum residency time is generally unattainable due to activities such as cleaning, testing, and repair that make drives unavailable to perform access requests for a portion of the day, the facility preferably compares actual residency time to an adjusted maximum residency time, such as 90% of theoretical maximum residency time. The facility preferably selects the highest daily adjusted utilization level in a month ("peak utilization lever") to represent the level of utilization for the month. The facility further preferably extrapolates peak utilization level for a number of consecutive months to project peak utilization level for future months, and indicates the acquisition of additional drives to avoid projected peak utilization levels in excess of 100%. This approach provides sufficient drive capacity to prevent substantial sustained waits to perform outstanding access requests in drive arrays whose demand is increasing, while avoiding the larger cost of acquiring enough drive capacity to prevent any such waits.

The objective of capacity planning is to ensure that sufficient resources are in place to continuously meet processing demands and service levels. The usage level measurement software facility of the present invention utilizes a residency time metric to facilitate capacity planning to predict true capacity needs and to provide accurate resource consumption for a given period of time. There are a number of techniques and variations in applying the residency time metric of the present invention and each is extremely flexible such that it may be tailored to meet the planning requirements of variously configured data centers.

BRIEF DESCRIPTION OF THE DRAWINGS

FIG. 4 is a data table diagram showing sample results for aggregating the residency times for each day.

DETAILED DESCRIPTION OF THE INVENTION

The present invention is directed to a usage level measurement software facility which utilizes a residency time metric to provide an accurate measure of data storage medium access device utilization. The process by which residency time may be determined is application specific; however, there are a number of queue times and wait times that are preferably collected and factored into the total residency time. For example, in an automated environment, the total residency time should capture all wait and queue times from the moment an actuating device, such as a robot, is directed to remove a storage element, such as a tape cartridge, from its storage container to satisfy a mount request to the moment the tape cartridge is returned to the storage container. This generally includes robot and pass through port queue and use times, MVS allocation time from step start to step complete, drive wait and rewind times. In a manual environment, mount pending, MVS allocation, drive wait and rewind times are preferably included. Whether a manual or automated environment, the application of the residency metric is the same, with the only difference being in the types and duration of the wait and queue times.

Thresholds are an integral part of the residency time metric and every storage medium environment is unique. Accordingly, a determination of acceptable thresholds is preferably made based on system configuration and processing requirements. Typically, installation service level commitments provide guidance in setting thresholds for performance and capacity. Once the threshold and a forecasting unit, e.g., peak day or shift, are defined, the residency time for that unit can be tracked and monitored. As the forecast or actual device utilization reaches the determined threshold, it indicates a need to begin planning an upgrade, or to look more closely at the input/output subsystem as a whole.

In a preferred embodiment, a usage level measurement software facility ("the facility") maintains a usage measure called "residency time" for an array of tape drives or other removable media devices. The tape drives of the array are used by a computer system to perform tape cartridge access requests ("access requests") for reading from or writing to tape cartridges. Residency time reflects, for a period of time such as a day, the total amount of time all of the tape drives spend performing access requests, also called the "total utilization" of the tape drive array. For example, if, in one day, in an array of four tapes drives, a first drive spent 600 minutes performing access requests, a second drive spent 720 minutes, a third drive spent 760 minutes, and a fourth drive spent 800 minutes, the residency time for the array for the day would be 2880 minutes (600 minutes+720 minutes+760 minutes+800 minutes). By comparing actual residency time for the array to theoretical maximum residency time, the facility determines a relative level of utilization of the array. For example, an array having four drives has a theoretical maximum residency time of 5760 minutes (4 drives×24 hours/day×60 minutes/hour). The 2880 minute example residency time therefore represents 50% utilization of the drive array (5760 minutes/2880 minutes).

Because theoretical maximum residency time is generally unattainable due to activities such as cleaning, testing, and repair that make drives unavailable to perform access requests for a portion of the day, the facility preferably compares actual residency time to an adjusted maximum residency time, such as 90% of theoretical maximum residency time. Thus, adjusted maximum residency time for the example above is 5184 minutes (5760 minutes×0.9), and adjusted utilization level is 56% (2880/5184). The facility preferably selects the highest daily adjusted utilization level in a month ("peak utilization lever") to represent the maximum level of utilization for that month. It is this maximum level that is used to forecast future demand for drive capacity. The facility further preferably extrapolates peak utilization level for a number of consecutive months to project peak utilization level for future months, and indicates the acquisition of additional drives to avoid projected peak utilization levels in excess of 100%. This approach provides sufficient drive capacity to prevent substantial sustained waits to perform outstanding access requests in drive arrays whose demand is increasing, while avoiding the larger cost of acquiring enough drive capacity to prevent any such waits. This approach reflects a "just in time" acquisition strategy, in accordance with which drive capacity is increased shortly before demand is expected to increase beyond present capacity.

Figure 1:
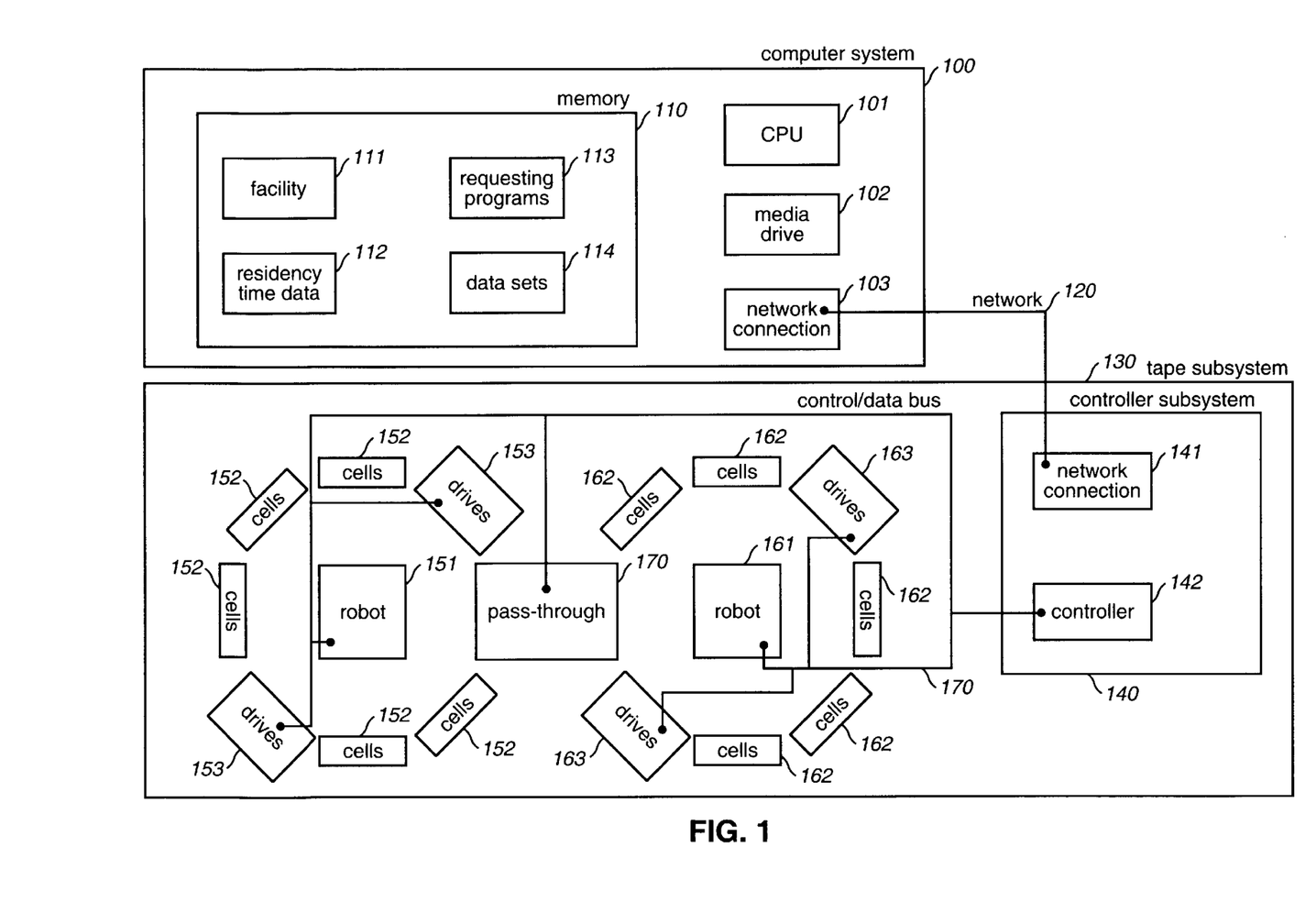
FIG. 1 is a high-level block diagram of the hardware configuration upon which the facility preferably operates.

FIG. 1 is a high-level block diagram of the hardware configuration upon which the facility preferably operates. The hardware configuration includes a computer system 100 and a tape subsystem 130 connected by a network 120. The computer system 100 contains a central processing unit (CPU) 101 and a network connection 103, through which the computer system 100 is connected to the network 120, and ultimately to the tape subsystem 130. The computer system also contains a computer-readable media drive 102, which can be used to install software products, including the facility, which are provided on a computer-readable medium, such as a CD-ROM. The computer system further contains a memory 110. The memory preferably contains the usage level measurement software facility 111, residency time data 112 compiled by the facility, one or more requesting programs 113 that generate access requests for reading data sets from or writing data sets onto tape cartridges, and one or more such data sets 114.

The tape subsystem 130 contains a controller subsystem 140. The controller subsystem includes a network connection 141 for receiving access requests from the computer system 100. The controller subsystem 140 further includes a controller 142 for controlling, via a control/data bus 170, tape silos containing tape drives to perform access requests. The tape subsystem 130 comprises two tape silos. The first tape silo is made up of a robot 151, storage cells 152, and tape drives 153. The robot 151, or "cartridge transfer mechanism," moves cartridges as needed from their storage cells 152 to tape drives 153 in order to perform access requests assigned to particular tape drives. A second silo is comprised of a robot 161, cartridge storage cells 162, and tape drives 163. If necessary, tapes may be exchanged between the two silos sing a pass-through mechanism 170. For example, the robot 151 in the first silo may deposit a particular cartridge in the pass-through mechanism 170, which may be removed from the pass-through mechanism by the robot 161 for the second silo. Such a transfer would allow a cartridge stored in one of the storage cells 152 of the first silo to be accessed using one of the drives 163 of the second silo. In this transfer, the first silo is said to be the "source silo" of the transfer, while the second silo is said to be the "destination silo." While the facility is preferably implemented on a hardware configuration as described above, those skilled in the art will recognize that it may also be implemented on different hardware configurations. For example, a different number of tape silos may be used, as may differently-configured tape silos. The components of the tape silos may be controlled directly by the computer system 100, or may be controlled by an intermediary other than the controller subsystem 140.

Figure 2:
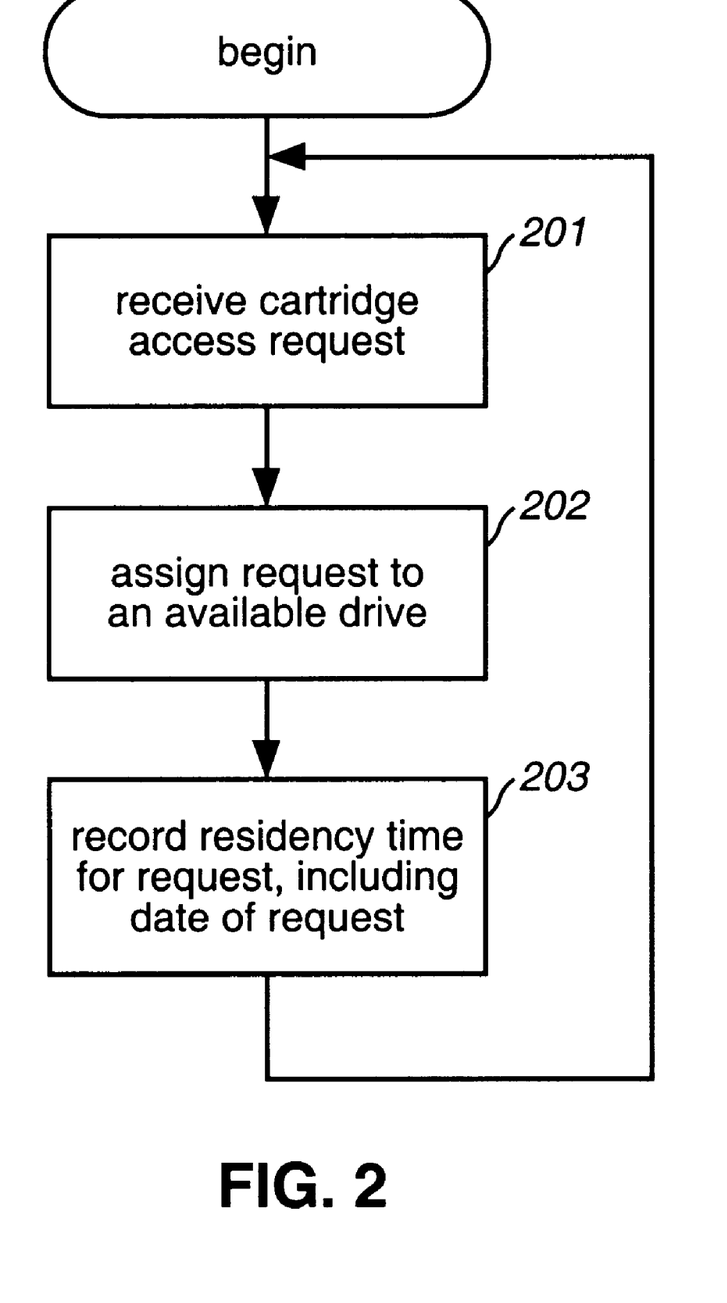
FIG. 2 is a flow diagram showing the steps preferably performed by the facility in order to record tape drive residency data.

FIG. 2 is a flow diagram showing the steps preferably performed by the facility in order to record tape drive residency data. The steps shown in FIG. 2 constitute a loop for processing each cartridge access request received from the requesting programs 113 (FIG. 1). In step 201, the facility receives a cartridge access request from the requesting programs. The received access request preferably contains an indication whether the request is for reading a data set or writing a data set; an identifier used to identify the data set within the tape subsystem; and a pointer to a memory location containing the data set for a write operation or for receiving the data set for a read operation. In step 202, the facility assigns the received request to an available tape drive, such as one of the tape drives 153 or 163. Assigning the received request preferably includes the step of identifying the particular tape cartridge from which the data set is to be read or to which the data set is to be written. The assigning step preferably further includes identifying a tape drive well suited to perform the request. This involves, for instance, selecting an available tape drive that is nearest to the storage cell containing the identified tape cartridge, and/or selecting an available tape drive having technical capacities that is suited to the particular access request. For example, if not all of the tape drives are capable of writing data, the facility preferably assigns a write request to one of the tape drives that are capable of writing data.

In step 203, the facility records the residency time incurred by the assigned tape drive in performing the request. Step 203 preferably involves storing this residency time, as well as an indication on the date on which the request was performed, as part of the residency time data 112 stored in the memory 110 of the computer system 100 (FIG. 1). In one embodiment in which the facility is executing on a mainframe computer system executing the Multi-programming Virtual Storage operating system, step 203 is performed as part of generating System Management Facility device operation statistics under the control of the Multi-programming Virtual Storage operating system. After step 203, the facility continues in step 201 to receive the next cartridge access request. While these steps are shown as a synchronous loop, in an alternate embodiment, step 203 is performed asynchronously in order to permit the next cartridge access request to be processed before the last-received cartridge access request is completely performed and its residency time is recorded.

The facility preferably uses one of several approaches for determining and recording residency time for a particular access request. In general, the residency time for a particular request is the time the drive is committed to perform that access request, and is therefore not available to perform another access request, whether or not such an additional access request has been received. In various embodiments, the residency time for a request starts at the time the request is received, at the time the request is assigned to a particular tape drive, or when the identified tape cartridge arrives at the assigned tape drive. In various embodiments, the residency time ends when the accessed cartridge is removed from the assigned tape drive, when the accessed cartridge is returned to a storage cell from the assigned tape drive, or when the robot becomes available after returning the accessed cartridge to a storage cell. Depending upon the particular details of the hardware configuration upon which the facility is implemented, various other events may be used to represent the beginning and end of the residency time for a particular access request.

Figure 3:
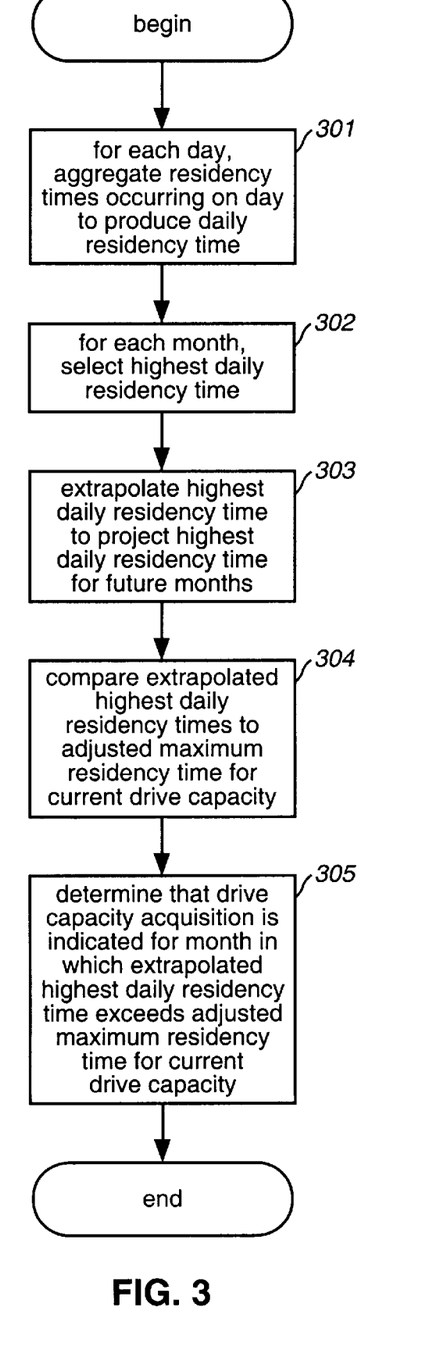
FIG. 3 is a flow diagram showing the steps preferably performed by the facility in order to aggregate the stored residency time data and use the aggregated residency time data to identify a future time at which drive capacity acquisition is indicated.

FIG. 3 is a flow diagram showing the steps preferably performed by the facility in order to aggregate the stored residency time data and use the aggregated residency time data to identify a future time at which drive capacity acquisition is indicated. In step 301, the facility aggregates the residency times recorded in step 203 (FIG. 2), so that the residency times occurring on each day are aggregated together for that day. In one embodiment in which the facility is executing on a mainframe computer system executing the Multi-programming Virtual Storage operating system, step 301 is performed using the Statistical Analysis System.

FIG. 4 is a data table diagram showing sample results for aggregating the residency times for each day. Data table 400 is made up of rows each corresponding to one day. Each row is divided into thirteen columns, including a residency time column 413. The residency time column 413 shows that, for example, the residency time total for Dec. 1, 1996 was 703 hours, 5 minutes, and that the residency time for Dec. 29, 1996 was 1,083 hours, 43 minutes. The rows are further divided into the following columns containing additional information about performing access requests: column 401, showing the date; column 402, showing the number of "mounts," or times a cartridge was moved to a tape drive, during the day; column 403, showing the host software component queuing time, or the time spent assigning tape drives to access requests during the day; column 404, showing additional queuing time; column 405, showing the time consumed by robot movement; column 406, showing the amount of time that tape cartridges waited on the source silo side of the pass-through mechanism before the pass-through mechanism moved the cartridge to the destination silo; column 407, showing the amount of time taken by the pass-through mechanism to move cartridges from the source silo to the destination silo; column 408, showing the amount of time cartridges waited on the destination silo side of the pass-through mechanism after being moved from the source silo to the destination silo and before being picked up by the robot of the destination silo; column 409, showing the amount of time spent by the robot of the destination silo moving cartridges from the pass-through mechanism to a location within the destination silo; column 410, showing the amount of time drives assigned to an access request waited for the cartridge specified by the access request to be delivered, column 411, showing the total response time for access requests; and column 412, showing the amount of time for which data was transferred to or from cartridges by tape drives.

Returning to FIG. 3, in step 302, the facility selects, for each month, the highest daily residency time aggregated in step 301. For example, for December 1996, table 400 (FIG. 4) shows that the highest daily residency time, 1,083 hours, 43 minutes, occurred on Dec. 29, 1996. This highest daily residency time is used by the facility to represent the level of the tape accessing demand before the tape subsystem. In step 303, the facility extrapolates the highest daily residency times for each month in order to project highest daily residency times for future months.

Figure 5:
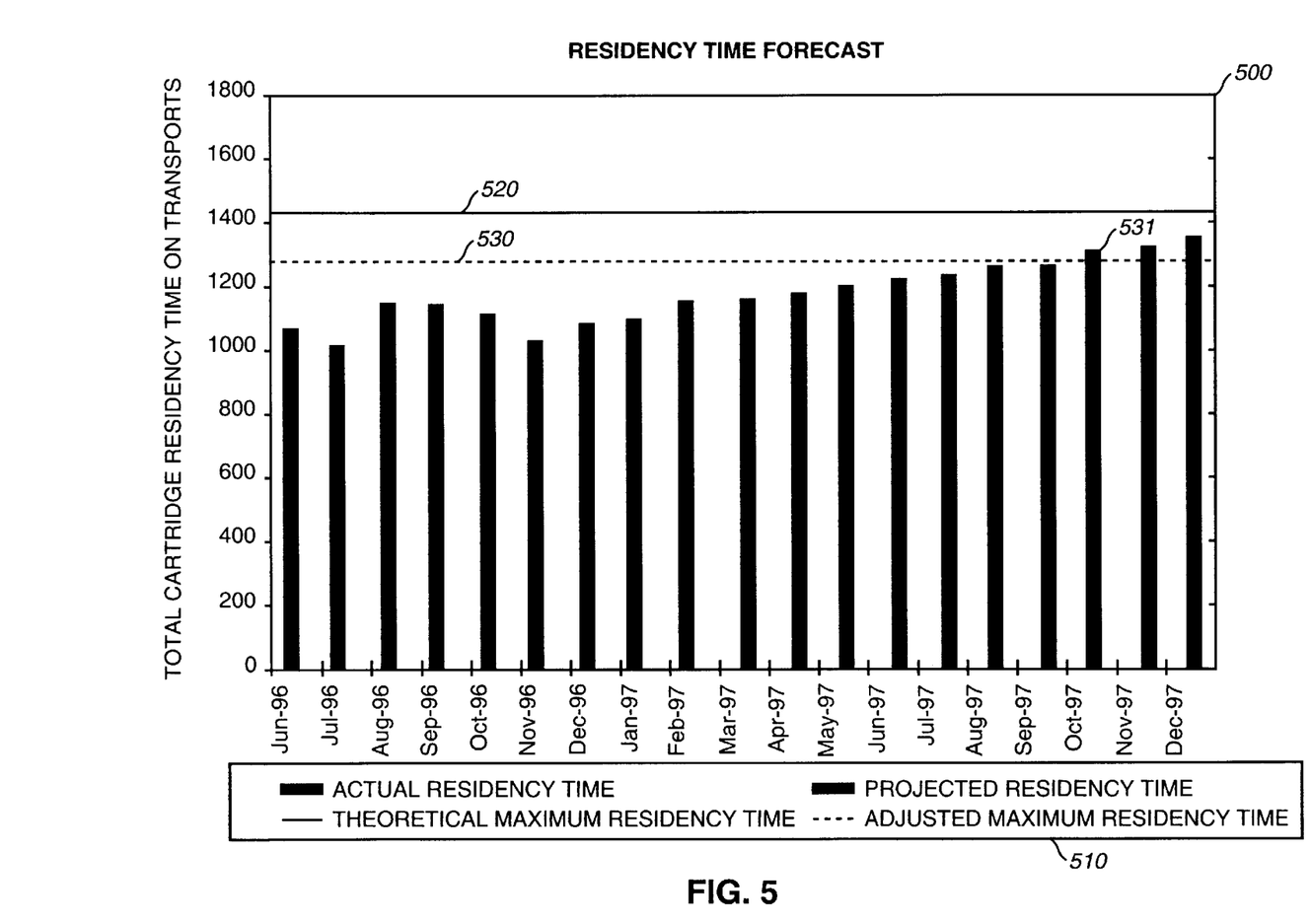
FIG. 5 is a graph showing residency time projections made by the facility.

FIG. 5 is a graph showing residency time projections made by the facility. The graph 500 has a key 510. The graph 500 shows actual highest daily residency times for the months from June 1996 to February 1997. It can be seen that these actual highest daily residency times correspond to the data shown in data table 400 (FIG. 4), in that the actual highest daily residency time for December 1996 shown in the data table is 1083 minutes, 43 seconds, for Dec. 29, 1996, and this highest daily residency time is shown for December 1996 in the graph 500. The graph 500 also contains projected highest daily residency times for months after February 1997, from March 1997 to December 1997.

Returning to FIG. 3, in step 304, the facility compares the extrapolated highest daily residency times for the adjusted maximum residency time for current drive capacity. In the example, the tape system has 60 tape drives. Theoretical maximum daily residency time is therefore 1440 hours (60 tape drives×24 hours). Adjusted maximum daily residency time, using an adjustment factor of 90 percent, is therefore 1296 hours (1440 hours×0.9). This theoretical maximum daily residency time is shown on graph 500 as solid line 520, while this adjusted maximum daily residency time is shown as dotted line 530. Returning to FIG. 3, in step 305, the facility determines that drive capacity acquisition is indicated, i.e., additional drives should be acquired, for the month in which the extrapolated highest daily residency time exceeds the adjusted maximum daily residency time for the current drive capacity. This point is illustrated in FIG. 5 at point 531, where the adjusted maximum residency line 530 first intersects the projected highest daily residency time in October 1997. In the example, therefore, the facility indicates that drive capacity acquisition is indicated in October 1997. This information may be used to ensure that sufficient additional tape drive capacity is available by October 1997.

While this invention has been shown and described with reference to preferred embodiments, it will be understood by those skilled in the art that various changes or modifications in form and detail may be made without departing from the scope of the invention. For example, the facility may preferably be used to analyze the usage level for other types of data storage media drives in which units of storage media are separable from the drives, including but not limited to drives for various forms of magnetic tape, magnetic disks, optical disks, magneto-optical disks, flash memories, crystalline memories, and biological memories. Further, the facility may be straightforwardly adapted to determine residency time totals for periods of time other than days and months.

I claim:

1. A computer-readable medium whose contents cause a computer system to forecast resource requirements for a group of removable media devices of a computer system by performing the steps of:

collecting residency time data for the removable media devices;

based upon the collected residency time data, calculating the maximum utilization of the removable media devices for a predetermined foregoing interval of time; and based upon the calculated maximum utilization of the removable media devices for the predetermined foregoing interval of time, generating a model of future maximum residency time usable to forecast resource requirements for the group of removable media devices.

2. The computer-readable medium of claim 1 wherein the group of removable media devices is an array of digital tape data cartridge drives.

3. The computer-readable medium of claim 1 wherein the collecting step includes the steps of:

receiving removable media access requests; and for each received removable media access request:

assigning the removable media access request to a particular one of the tape drives;

under the control of the tape drive to which the data storage medium access request is assigned, performing the removable media access request; and recording a residency time reflecting the amount of time taken by the tape drive to perform the removable media access request.

4. The computer-readable medium of claim 3 wherein the performing step includes the step of reading data from a removable media mounted on the tape drive to which the data storage medium access request is assigned.

5. The computer-readable medium of claim 3 wherein the performing step includes the step of writing data to a removable media mounted on the tape drive to which the data storage medium access request is assigned.

6. The computer-readable medium of claim 3 wherein the contents of the computer-readable medium further cause the computer system to perform the step of:

for each received removable media access request:

determining the residency time by determining the amount of time for which performing the removable media access request makes the tape drive unavailable for performing new removable media access requests.

7. The computer-readable medium of claim 3 wherein the contents of the computer-readable medium further cause the computer system to perform the step of:

for each received removable media access request:

determining the residency time by determining the amount of time for which the removable media access request is assigned to the tape drive.

8. The computer-readable medium of claim 3 wherein the contents of the computer-readable medium further cause the computer system to perform the step of:

for each received removable media access request:

determining the residency time by determining the length of a period beginning at the time the removable media access request is received.

9. The computer-readable medium of claim 3 wherein the contents of the computer-readable medium further cause the computer system to perform the step of:

for each received removable media access request:

determining the residency time by determining the length of a period beginning at the time at which the removable media access request is assigned to a tape drive.

10. The computer-readable medium of claim 3 wherein the performing step includes the step of transferring a removable media identified in the removable media access request to the tape drive to which the removable media access request is assigned, and wherein the contents of the computer-readable medium further cause the computer system to perform the step of:

for each received removable media access request:

determining the residency time by determining the length of a period beginning at the time at which the removable media identified in the received removable media access request is transferred to the tape drive.

11. The computer-readable medium of claim 3 wherein the performing step includes the step of, when accessing is complete, transferring the removable media identified in the received removable media access request from the tape drive to which the removable media access request is assigned to a storage location, and wherein the contents of the computer-readable medium further cause the computer system to perform the step of:

for each received removable media access request:

determining the residency time by determining the length of a period ending at the time at which the removable media identified in the received removable media access request is transferred to the storage location.

12. The computer-readable medium of claim 3 wherein the performing step includes the step of, when accessing is complete, transferring the removable media identified in the received removable media access request from the tape drive to which the removable media access request is assigned to a storage location, and wherein the contents of the computer-readable medium further cause the computer system to perform the step of:

for each received removable media access request:
determining the residency time by determining the length of a period beginning at the time at which the removable media access request is received and ending at a time at which the removable media identified in the received removable media access request is transferred to the storage location.

13. The computer-readable medium of claim 3 wherein the performing step includes the step of, when accessing is complete, under the control of a cartridge transfer mechanism, transferring the unit of the removable media identified in the received removable media access request from the tape drive to which the removable media access request is assigned to a storage location, and wherein the contents of the computer-readable medium further cause the computer system to perform the step of:

for each received removable media access request:
determining the residency time by determining the length of a period ending at the time at which the cartridge transfer mechanism becomes available after transferring the removable media identified in the received removable media access request to the storage location.

14. The computer-readable medium of claim 3 wherein the performing step includes the step of, when accessing is complete, transferring the removable media identified in the received removable media access request from the tape drive to which the removable media access request is assigned to a storage location, and wherein the contents of the computer-readable medium further cause the computer system to perform the step of:

for each received removable media access request:
determining the residency time by determining the length of a period ending at the time at which the removable media identified in the received removable media access request is removed from the tape drive to which the removable media access request is assigned during the performance of the transferring step.

15. The computer-readable medium of claim 3 wherein the contents of the computer-readable medium further cause the computer system to perform the step of:

extrapolating the measure of the usage level of the plurality of tape drives produced by aggregating the recorded residency times to produce a forecast of future demand for tape drive capacity.

16. The computer-readable medium of claim 15 wherein the contents of the computer-readable medium further cause the computer system to perform the step of:

comparing the forecast of future demand produced in the extrapolating step of a measure of present tape drive capacity to determine whether expansion of tape drive capacity is indicated.

17. The computer-readable medium of claim 16, further comprising the step of, where the comparing step determines that expansion of tape drive capacity is indicated, triggering a predictive acquisition to meet the forecasted future demand.

18. A method for forecasting resource requirements for removable media devices of a computer system, comprising the steps of:

collecting residency time data for the removable media devices of a computer system;

based upon the collected residency time data, calculating a maximum utilization of the removable media devices for a predetermined foregoing interval of time; and based upon the calculated maximum utilization of the removable media devices for the predetermined foregoing interval of time, generating a model of future maximum residency time usable to forecast resource requirements for the removable media devices.

19. The method of claim 18 wherein the collecting step includes the steps of:

receiving data storage medium access requests; and for each received data storage medium access request:
delegating the data storage medium access request to a particular one of the data storage medium access devices;

under the control of the removable media device to which the data storage medium access request is delegated, performing the data storage medium access request; and recording a residency time reflecting the amount of time taken by the removable media device to perform the data storage medium access request.

20. The method of claim 19 wherein the performing step includes the step of reading data from a removable medium mounted on the removable media device to which the data storage medium access request is assigned.

21. The method of claim 19 wherein the performing step includes the step of writing data to a removable media mounted on the removable media device to which the data storage medium access request is assigned.

22. The method of claim 19, further comprising the step of:

for each received data storage medium access request:
determining the residency time by determining the amount of time for which performing the data storage medium access request makes the removable media device unavailable for performing new data storage medium access requests.

23. The method of claim 19, further comprising the step of:

for each received data storage medium access request:
determining the residency time by determining the amount of time for which the data storage medium access request is delegated to the removable media device.

24. The method of claim 19, further comprising the step of:

for each received data storage medium access request:
determining the residency time by determining the length of a period beginning at the time the data storage medium access request is received.

25. The method of claim 19, further comprising the step of:

for each received data storage medium access request:
determining the residency time by determining the length of a period beginning at the time at which the data storage medium access request is delegated to a removable media device.

26. The method of claim 19 wherein the performing step includes the step of conveying a unit of the data storage medium identified in the received data storage medium access request to the removable media device to which the data storage medium access request is delegated, the method further comprising the step of:

for each received data storage medium access request:
determining the residency time by determining the length of a period beginning at the time at which the unit of the data storage medium identified in the received data storage medium access request is conveyed to the removable media device.

27. The method of claim 19 wherein the performing step includes the step of, when accessing is complete, conveying the unit of the data storage medium identified in the received data storage medium access request from the removable media device to which the data storage medium access request is delegated to a storage location, the method further comprising the step of:

for each received data storage medium access request:
determining the residency time by determining the length of a period ending at the time at which the unit of the data storage medium identified in the received data storage medium access request is conveyed to the storage location.

28. The method of claim 19 wherein the performing step includes the step of, when accessing is complete, transferring the removable medium identified in the received removable medium access request from the tape drive to which the removable medium access request is assigned to a storage location, and wherein the contents of the computer-readable medium further cause the computer system to perform the step of:

for each received removable medium access request:

determining the residency time by determining the length of a period beginning at the time at which the removable medium access request is received and ending at a time at which the removable medium identified in the received removable medium access request is transferred to the storage location.

29. The method of claim 19 wherein the performing step includes the step of, when accessing is complete, under the control of a conveyance mechanism, conveying the unit of the data storage medium identified in the received data storage medium access request from the removable media device to which the data storage medium access request is delegated to a storage location, the method further comprising the step of:

for each received data storage medium access request:
determining the residency time by determining the length of a period ending at the time at which the conveyance mechanism becomes available after conveying the unit of the data storage medium identified in the received data storage medium access request to the storage location.

30. The method of claim 19 wherein the performing step includes the step of, when accessing is complete, conveying the unit of the data storage medium identified in the received data storage medium access request from the removable media device to which the data storage medium access request is delegated to a storage location, the method further comprising the step of:

for each received data storage medium access request:
determining the residency time by determining the length of a period ending at the time at which the unit of the data storage medium identified in the received data storage medium access request is removed from the removable media device to which the data storage medium access request is delegated during the performance of the conveying step.

31. The method of claim 19, further comprising the step of:

extrapolating the measure of the usage level of the plurality of removable media devices produced by aggregating the recorded residency times to produce a forecast of future demand for removable media device capacity.

32. The method of claim 31, further comprising the step of:

comparing the forecast of future demand produced in the extrapolating step of a measure of present removable media device capacity to determine whether expansion of removable media device capacity is indicated.

33. The method of claim 31, further comprising the step of, where the comparing step determines that expansion of tape drive capacity is indicated, triggering a predictive acquisition to meet the forecasted future demand.

34. An apparatus for performing a measured level of data storage medium access service, comprising:

a plurality of removable media devices each for accessing a mounted unit of a data storage medium, each removable media device capable of being either in service and capable of accessing a mounted unit of the data storage medium or out of service and incapable of accessing a mounted unit of the data storage medium;

a mounting subsystem for mounting particular units of the data storage medium on particular removable media devices;

a control unit for receiving data storage medium access requests, directing each received data storage medium access request to a particular available removable media device, and causing the mounting subsystem to mount a unit of the data storage medium specified in each received data storage medium access request on the removable media device to which the received data storage medium access request was directed;

a service demand measurement subsystem that measures the level of data storage medium access service demanded of the plurality of removable media devices by determining the total amount of time that each removable media device is in service but unavailable to perform new data storage medium access requests; and a demand forecasting subsystem for extrapolating the level of service measured by the service measurement subsystem to produce a forecast of future demand for removable media device capacity.

35. The apparatus of claim 34 wherein the plurality of removable media devices is an array of digital tape drives.

* * * * *